United States Patent [19]

Merriman, Jr. et al.

[11] Patent Number: 5,063,115
[45] Date of Patent: Nov. 5, 1991

[54] ELECTRONIC DEVICE COATED WITH A POLYIMIDE COATING COMPOSITION

[75] Inventors: Burt T. Merriman, Jr., Willingboro, N.J.; David L. Goff, Hockessin, Del.

[73] Assignee: E. I. du Pont de Nemours and Company, Wilmington, Del.

[21] Appl. No.: 538,591

[22] Filed: Jun. 15, 1990

Related U.S. Application Data

[63] Continuation of Ser. No. 88,142, Aug. 21, 1987, abandoned.

[51] Int. Cl.$^5$ ................................................. B32B 9/04
[52] U.S. Cl. ........................................ 428/447; 427/79; 427/96; 427/387; 525/431; 525/436; 528/26; 528/36; 528/38; 528/41; 528/351; 524/188; 524/261; 524/262; 524/265
[58] Field of Search ................. 525/431, 436; 528/351, 528/26, 30, 38, 41; 524/188, 261, 262, 265; 428/447; 427/96, 79

[56] References Cited

U.S. PATENT DOCUMENTS

| | | | |
|---|---|---|---|
| 3,179,634 | 4/1965 | Edwards | 260/78 |
| 3,288,754 | 11/1966 | Green | 260/47 |
| 3,926,911 | 12/1975 | Greber et al. | 525/431 |
| 3,948,835 | 4/1976 | Greber et al. | 525/431 |
| 4,200,724 | 4/1980 | Darms et al. | 528/26 |
| 4,306,073 | 12/1981 | Darms et al. | 556/419 |
| 4,389,504 | 6/1983 | Clair et al. | 524/233 |
| 4,430,153 | 2/1984 | Gleason et al. | 156/643 |
| 4,499,149 | 2/1985 | Berger | 428/447 |
| 4,499,252 | 2/1985 | Igarashi et al. | 528/38 |
| 4,562,119 | 12/1985 | Darms et al. | 428/458 |
| 4,591,653 | 5/1986 | Kunimune et al. | 556/419 |
| 4,645,688 | 2/1987 | Makino et al. | 427/82 |

FOREIGN PATENT DOCUMENTS 58-168624 10/1983 Japan.

OTHER PUBLICATIONS

Hackh's Chemical Dictionary, pp. 35 and 36, 4th ed. (New York, McGraw-Hill Book Co., 1972).

*Primary Examiner*—Melvyn I. Marquis

[57] ABSTRACT

A polyimide coating composition comprising an homogeneous liquid solution of (a) a polyimide or polyimide precursor, (b) a substituted silane compound and (c) aprotic solvent. The silane compound corresponds to the structure:

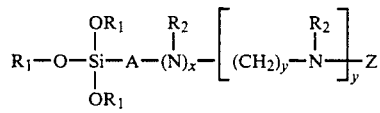

2 Claims, No Drawings

ELECTRONIC DEVICE COATED WITH A POLYIMIDE COATING COMPOSITION

This application is a continuation of application Ser. No. 07/088,142 filed Aug. 21, 1987 now abandoned.

FIELD OF INVENTION

The invention is directed to polyimide coating compositions which form highly adherent films on various substrates.

BACKGROUND OF THE INVENTION

Polyimides find extensive use in electronic applications where they are useful in forming dielectric films on electrical and electronic devices such as capacitors and semiconductors. Typical uses for polyimides include protective coatings for semiconductors, dielectric layers for multilayer integrated circuits, high temperature solder masks, bonding multilayer circuits, final passivating coatings on electronic devices and the like.

It is well known in the polymer art to make thermally stable all-aromatic polyimides by the condensation polymerization of dianhydrides and diamines to form polyamic acid. Such polyimide precursors are disclosed inter alia in U.S. Pat. No. 3,179,634 to Edwards. Solutions of such polyamic acids in aprotic solvents are then coated on appropriate substrates and then dehydrated to the corresponding polyimides by heating at high temperatures, e.g., 300° to 400° C.

In each application the polyimide is applied as a liquid or in the form of its polyamic acid precursor which then must be cured by heating to form the polyimide. A typical high performance aromatic polyimide does not naturally adhere well to inorganic substrates, and areas having poor adhesion can become sites for later metal corrosion.

Heretofore, the problems of adhesion of polyimide or polyimide precursors to inorganic substrates were approached mainly by applying a layer of adhesion promoter to the substrate which was capable of serving as a reaction site with the polyamic acid precursor of the polyimide. However, this involves an additional step in the already complex fabrication process for electronic components.

To avoid such an extra processing step, there have been attempts to incorporate adhesion promoters directly into the polyimide or polyamic acid coating solution. Aminosilane materials such as N-(triethoxysilylpropyl)amino maleic acid have been used for this purpose. However, such one-step application systems frequently have the disadvantage that they require that the initial polymer cure be carried out at a temperature of 250° to 300° C. in air to obtain adequate adhesion. It would therefore be highly advantageous to have a one-step system which would not require a high temperature cure in air, but can be carried out in a non-oxidizing atmosphere such as nitrogen or argon to reduce device metal oxidation.

PRIOR ART

U.S. Pat. No. 3,288,754, Green

The reference is directed to polyamide-polyimides containing organosilyl groups.

U.S. Pat. No. 4,200,724, Darms et.al.

The reference is directed to polymeric adhesion promoters containing imidyl and silyl groups. The reference discloses generally the use of various silanes to improve adhesion of fiber-reinforced plastics, lacquers and adhesives.

U.S. Pat. No. 4,306,073, Darms et.al.

Monomeric, oligomeric and polymeric silicon-modified bis-phthalic acid derivatives are used as adhesion promoters for resins.

U.S. Pat. No. 4,389,504, Clair et.al.

The reference is directed to rubber-toughened polyamic acid adhesive compositions terminated with aromatic aminosilane groups.

U.S. Pat. No. 4,430,153, Gleason et.al.

The reference is directed to converting the surface of aromatic polyimides to a silicon-containing alkyl polyamide-polyimide for the purpose of improving adhesion to inorganic substrates such as $SiO_2$, $Si_3N_4$ and aluminum.

U.S. Pat. No. 4,499,149, Berger

The reference discloses that the adhesive properties of polyamides are improved by incorporating a polysiloxane unit into the molecule.

U.S. Pat. No. 4,499,252, Igarashi et.al.

The reference is directed to polyimide precursors having aminosilane groups incorporated into the polymer. The polymer is made by reacting a silane-modified polycarboxylic acid with a diamine.

U.S. Pat. No. 4,562,119, Darms et.al.

The reference is directed to flexible printed circuits in which adhesion of the printed tracks is improved by coating one side of the printed foil with a layer of polyimide or polyamide-imide containing siloxane groups.

U.S. Pat. No. 4,591,653, Kunimune et.al.

The reference is directed to a silane-polyimide precursor which is the coreaction product of a silicone diamine with an aromatic tetracarboxylic acid anhydride and an aminosilicone compound.

U.S. Pat. No. 4,645,688, Makino et.al.

The reference is directed to encapsulating materials which are comprised of polyamic acids obtained by reaction of a diaminosiloxane, an organic diamine and a tetracarboxylic acid dianhydride.

J58168624, Nitto (Assignee)

The reference is directed to screen printable pastes containing polyamic acids modified with diaminosiloxane. The pastes are said to form films having good adherence to substrates.

SUMMARY OF THE INVENTION

The invention in its primary aspect is directed to a coating composition comprising an homogeneous liquid solution of:
(a) polyimide or polyimide precursor;
(b) a silane compound corresponding to the structural formula:

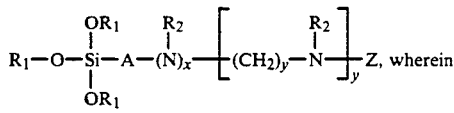

$R_1$ is independently selected from $C_{1-3}$ alkyl groups;

A is either phenylene or —($—CH_2—$)w in which w is an integer of from 1 to 6;

$R_2$ is independently selected from -H and $C_{1-3}$ alkyl groups;

Z is independently selected from —H, $C_{1-8}$ alkyl, $C_{7-12}$ alkaryl, $C_{7-12}$ aralkyl, glycidyl, aromatic carboxyl,

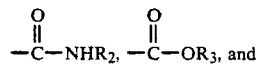

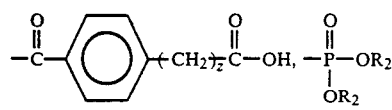

in which $R_3$ is phenyl or $C_{1-8}$ alkyl;

x is zero or 1;

y is Zero or an integer of from 1 to 3; and z is zero or an integer of from 1 to 3; the sum of the carbon atoms in moieties $R_2$ and Z being at least 3; and (c) aprotic solvent, the weight ratio of (b) to (a) being from 0.01 to 0.2.

In a second aspect, the invention is directed to an inorganic substrate on which is mounted at least one semiconductor or other electronic device, which device is coated and/or encapsulated with a polymeric film which was formed by applying to the substrate and/or the device a coating of the above-described composition and then heating it to harden the coating by removal of solvent therefrom and/or by imidization.

DETAILED DESCRIPTION OF THE INVENTION

Aprotic Solvent

The preparation of soluble polyimides and polyamic acid precursors of polyimides is carried out by condensation polymerization of dianhydrides and diamines in an aprotic solvent medium. Therefore, suitable aprotic solvents for the method of the invention are N-methyl pyrrolidone, dimethylacetamide, dimethyl sulfoxide and dimethylformamide. N-methyl pyrrolidone is a particularly preferred solvent for use in the invention. Mixtures of the solvents can be used as well to adjust the volatility of the solvent medium. The solvent should, however, be substantially free of water. Solvents having a water content of no more than 0.1% wt. are preferred.

Polyimide or Polyimide Precursors

It is well known in the polymer art to make thermally stable all-aromatic polyimide precursors by the condensation polymerization of dianhydrides and diamines to form polyamic acid. Such polyimide precursors are disclosed inter alia in U.S. Pat. No. 3,179,634 to Edwards.

A wide variety of polyamic acids (polyimide precursors) and soluble polyimides can be used in the compositions of the invention such as the thermally stable aromatic polyimides disclosed in Edwards, U.S. Pat. No. 3,179,634 and by Fryd in U.S. Pat. No. 4,588,804 and the polyimides which are disclosed by Fryd and Merriman in U.S. Pat. No. 4,533,574 and U.S. Pat. No. 4,562,100. Photopolymerizable polyimides such as those disclosed by Fryd and Goff in U.S. Pat. No. 4,551,522 are also useful for the practice of the invention.

Solutions of polyimide precursors such as polyamic acids form hardened coatings by heating to high temperatures, e.g., 300° to 400° C., by which the polyamic acid is imidized and solvent is removed therefrom. Similarly, soluble polyimides form hardened coatings by heating to remove the solvent.

Silane Compound

The silane compounds which are useful in the invention are those corresponding to the structural formula:

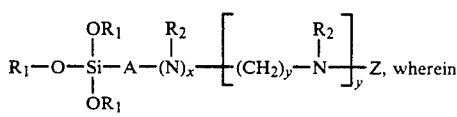

$R_1$ is independently selected from $C_{1-3}$ alkyl groups;

A is either phenylene or —($—CH_2—$)w in which w is an integer of from 1 to 6;

$R_2$ is independently selected from —H and $C_{1-3}$ alkyl groups;

Z is independently selected from —H, $C_{1-8}$ alkyl, $C_{7-12}$ alkaryl, $C_{7-12}$ aralkyl, glycidyl,

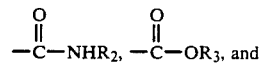

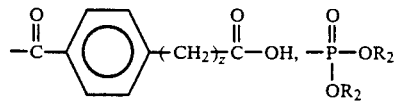

in which $R_3$ is phenyl or $C_{1-8}$ alkyl;

x is zero or 1;

y is zero or an integer of from 1 to 3;

z is zero or an integer of from 1 to 3; the sum of the carbon atoms in moieties $R_2$ and Z being at least 3.

Among the extensive possible variations in the above-described silane structure, the following structural variations are preferred:

| Moiety | Preferred Range or Composition |
|---|---|
| $R_1$ | $C_2$ alkyl |
| A | $(CH_2—)_3$ |
| $R_2$ | —H |
| x | 1 |
| y | 0 |
| z | $-\overset{O}{\underset{\|}{C}}-NH_2$ or $-\overset{O}{\underset{\|}{C}}-OR_3$ in which $R_3 = C_2$ alkyl |

Particularly preferred silane compounds for use in the invention are N-(triethoxysilylpropyl) urea and triethyloxysilylpropylethylcarbamate.

The amount of silane compounds which should be used in the compositions of the invention is dependent upon the amount of polyimide. It has been found that the weight ratio of the silane compound to polyimide should be at least 0.01 and preferably 0.02. On the other hand, the properties of the polyimide may be degraded when too high concentrations of silane are used. It is therefore preferred that the weight ratio of amino silane to polyimide not exceed about 0.2. A particularly appropriate range of concentration is 0.02–0.1.

Mixtures of silane compounds falling within the above structural definition can, of course, be used. The above-described silanes may also be diluted with other silane adhesion promoters, such as those disclosed in the prior art, so long as the ratio of component (b) to component (a) is within the above prescribed limits.

Substrate:,

The benefits of the invention in improving the adhesion of polyimide coatings is obtained on a wide variety of substrates including silicon, silica, silicon nitride, alumina and on aluminum metal as well.

Test Procedures

Adhesion

In the examples below, the composition of the invention were tested as to substrate adhesion by spin coating onto the substrate in question a thin layer of the coating composition. The coated substrate is then heated to 350° C. to remove solvent and, in the case of polyamic acids, to convert the coatings to the polyimide form. In some instances, the coated substrate is first tested as to coating adhesion under dry conditions and in other instances it is tested after prolonged exposure to boiling water. The adhesion test is done in accordance with the procedure of ASTM D3359-83.

The invention can be better understood by reference to the following examples.

EXAMPLES

Example 1 - Preparation of Polyamic Acid

The polyamic acid was prepared by adding 10.0 grams (0.05 mole) of oxydianiline and 5.4 grams (0.05 mole) of metaphenylene diamine to 203 grams of N-methyl pyrrolidone (NMP) in a 500 ml three-neck flask equipped with a mechanical stirrer. The mixture was stirred at room temperature until all the diamine was dissolved. To this solution 32.2 grams (0.10 mole) of 3,3',4,4'-benzophenone tetracarboxlic acid dianhydride (BTDA) was added slowly over 30 minutes. The reaction temperature was maintained below 40° C. for 2 hours. The resulting solution was filtered prior to use.

Examples 2–4 - Comparative Adhesion Tests

Three separate samples of the polyamic acid solution of Example 1 were used to determine the relative adhesion of the coatings of the invention to a 3-inch round silicon substrate. To one sample was added N-(triethoxysilylpropyl)urea (TSPU) in a weight ratio of 0.02 with respect to the polymer content of the polyimide solution. To a second sample was added triethoxysilylpropylamino maleic acid in the same weight ratio. Each of the two solutions and a third sample of the polyimide solution containing no adhesive promoter was spin-coated on a silicon substrate and hardened by heating to 300°–400° C. The coated substrate was then soaked in boiling water and tested as to adhesion by the procedure described above. The data for these tests are given in Table 1 below:

TABLE 1

| | Comparative Adhesion Tests | | |
|---|---|---|---|
| Example No. | Adhesion Promoter | Soaking Time | Adhesion[1] |
| 2 | None | 2 | 1 |
| 3 | Triethoxysilylpropyl-amino maleic acid | 66 | 1 |
| 4 | N-(triethoxysilyl-propyl)urea (TSPU) | 88 | 5 |

[1]5 = Excellent; 4 = Very Good; 3 = Good-No Adhesion Lost; 2 = Partial Failure; 1 = Failure.

These data show that the use of the prior art silane material (Example 3) was more effective than using no adhesion promoter at all. Nevertheless, the prior art material was relatively ineffective as compared to the compositions of the invention, which retained excellent adhesion even after 88 hours soaking in boiling water.

examples 5–7 - THERMAL STABILITY heated to 350° C. to remove solvent and, in the case of Coated wafer samples identical to those of Examples 2–4 were subjected to thermogravimetric analysis (TGA) to observe whether the addition of the silane compounds resulted in any thermal destabilization of the polyimide. The data from these tests, which are given in Table 2 below, indicate that neither the silane used by applicants nor the silane used by the prior art caused any significant destabilization of the polyimide.

TABLE 2

| | Thermal Stability Measured by TGA | | | | |
|---|---|---|---|---|---|
| Example No. | Adhesion Promoter | % Weight Retained at Temperature[2] | | | |
| | | 500° C. | 525° C. | 550° C. | 575° C. |
| 5 | None | 96 | 94 | 92 | 86 |
| 6 | Triethoxy-silylpropyl amino maleic acid | 96 | 94 | 91 | 84 |
| 7 | N-(triethoxy-silylpropyl) urea | 96 | 97 | 91 | 88 |

[2]While heating at 10° C. per minute.

EXAMPLES 8–11 - ADHESION TO DIFFERENT SUBSTRATES

The composition of Examples 4 and 7 containing by weight TSPU was applied by spin coating to a number of 3-inch round wafer substrates made from different commonly used substrate materials. The data from these tests indicate that the composition of the invention was comparably effective on all four of the substrated tested.

TABLE 3

| | Adhesion to Various Substrates | | |
|---|---|---|---|
| | | Adhesion[3] | |
| Example No. | Substrate Materials | No Boiling Water | 72 Hours Boiling Water |
| 8 | Silicon | 5 | 5 |
| 9 | Silica | 5 | 5 |
| 10 | Silicon Nitride | 5 | 5 |

TABLE 3-continued

| | | Adhesion to Various Substrates | |
|---|---|---|---|
| | | Adhesion[3] | |
| Example No. | Substrate Materials | No Boiling Water | 72 Hours Boiling Water |
| 11 | Aluminum | 5 | 5 |

[3] 5 = Excellent; 4 = Very Good; 3 = Good-No Adhesion Lost; 2 = Partial Failure; 1 = Failure.

EXAMPLE 12-14 - POLYIMIDE VARIATIONS

A further series of three polyimide solutions containing 2% wt. TSPU as an adhesive promoter was prepared in the manner described above to determine whether the effectiveness of the compositions of the invention is comparable for different polyimides. The three polyimides used can be characterized as follows:

| Example 12 | Same as Example 1 |
|---|---|
| Example 13 | PI-2590, a pre-imidized polyimide from E. I. du Pont de Nemours & Company, Wilmington, DE |
| Example 14 | PD-2702, a photopolymerizable polyamide ester from E. I. du Pont de Nemours & Co., Wilmington, DE |

The above-described three coating solutions were spin-coated onto a 3-inch round silicon wafer and hardened at 350° C., after which they were adhesion tested after soaking in boiling water for 88 hours. The coatings of Examples 12 and 13 both had adhesion ratings of 5, and the coating of Example 14 had an adhesion rating of 4. From these data, it is evident that the compositions of the invention are effective with a wide variety of polyimide-type coating materials.

We claim:

1. An electronic component comprising an inorganic substrate having an electronic device mounting thereon which is coated by a polymeric film formed by applying thereto a coating of a composition comprising an homogeneous liquid solution of:
    (a) polyimide, polyamic acid or polyamide ester;
    (b) silane compound corresponding to the structural formula:

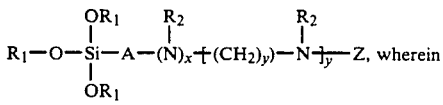

$R_1$ is independently selected from $C_{1-3}$ alkyl groups;
A is either phenylene or $(CH_2)w$ in which w is an integer of from 1 to 6:
$R_2$ is independently selected from —H and $C_{1-3}$ alkyl groups;
Z is independently selected from —H, $C_{1-8}$ alkyl, $C_{7-12}$ alkaryl, $C_{7-12}$ aralkyl, glycidyl, romantic carboxyl,

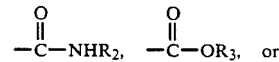

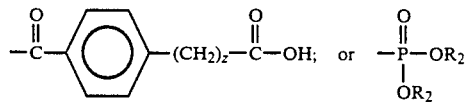

in which $R_3$ is phenyl or $C_{1-8}$ alkyl;
x is zero or 1;
y is zero or an integer of from 1 to 3; and
z is zero or an integer of from 1 to 3; the sum of the carbon atoms in moieties $R_2$ and Z being at least 3; and
    (c) aprotic solvent, the weight ratio of (b) to (a) being from 0.01 to 02
and heating the applied coating to remove solvent therefrom.

2. The electronic component of claim 1, in which the polymer component (a) of the coating is a polyamic acid which is dehydrated during he heating step to form the corresponding polyimide.

* * * * *